US005332495A

United States Patent [19]

Williams

[11] Patent Number: 5,332,495

[45] Date of Patent: Jul. 26, 1994

[54] CONNECTOR APPARATUS

[76] Inventor: Richard T. Williams, P.O. Box 39, Uwchland, Chester County, Pa. 19480

[21] Appl. No.: 869,761

[22] Filed: Apr. 16, 1992

[51] Int. Cl.[5] ........................ B01D 35/00

[52] U.S. Cl. ........................ 210/172; 220/461; 220/465; 285/200; 285/205; 285/332.3

[58] Field of Search ........................ 210/282, 416.3, 172; 220/460, 461, 465; 285/200, 205, 332.3

[56] References Cited

U.S. PATENT DOCUMENTS

| | | | |
|---|---|---|---|
| 663,271 | 12/1900 | Hamilton | 210/282 |
| 3,016,248 | 1/1962 | Lindberg | 285/332.3 |
| 4,076,147 | 2/1978 | Schmit | 220/465 |
| 4,828,698 | 5/1989 | Jewell et al. | 210/282 |

*Primary Examiner*—Matthew O. Savage

*Attorney, Agent, or Firm*—John F. A. Earley; John F. A. Earley, III

[57] ABSTRACT

A detachable connector apparatus to provide an outlet from a bag includes a hollow nipple having a stem extending through the bag, and a nipple clamp engaged with the nipple and a portion of the bag. The bag may be supported in a pouch and locked thereto by a locking ring, which engages the nipple clamp. An optional end cap is provided to stop the fluid flow and seal off the nipple.

6 Claims, 2 Drawing Sheets

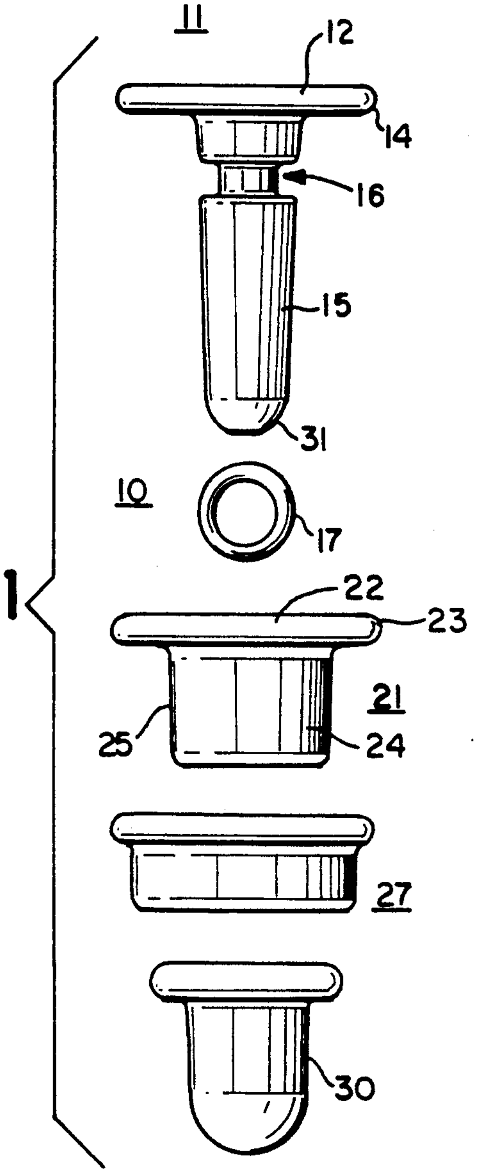
FIG. 1
FIG. 2
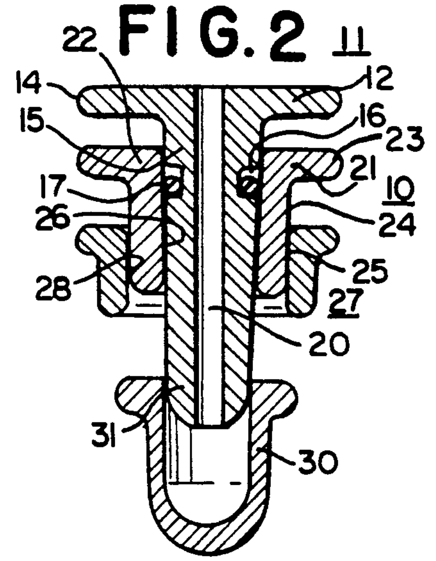
FIG. 4
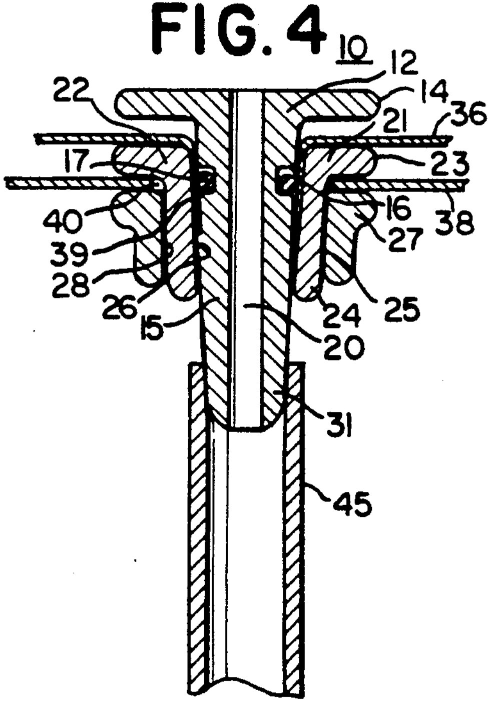

CONNECTOR APPARATUS

BACKGROUND OF THE INVENTION

1. Field of the Invention

This invention relates to a detachable connector apparatus of the nipple type which is connected to and provides a fluid flow outlet from a bag.

2. Description of the Prior Art

Bags constructed of plastic film which contain fluids are useful in many applications. Such bags may or may not have integral outlets. Where a bag is not available with an integral outlet, and where it was found necessary to provide the bag with an outlet, such as, with the use of a portable water purification device such as the "first need"® portable water purification device of General Ecology, Inc., Exton, Pa., the requirements necessitated the development of an easily installed outlet.

Many water purification devices operate by pumping water from a contaminated source through a purification canister or filter, and work satisfactorily until the purification canister or filter becomes clogged. These devices are serviced by backwashing the canister or by replacing the canister. A source of pure water is required for backwashing. In an outdoor environment, a source of pure water for backwashing or a replacement canister may not be available.

It has been found that the clogged canister still operates where the water is gravity fed to the inlet of the canister of a water purification device. The canister treats the water and provides purified water on a limited basis, until the canister can be replaced or properly serviced. However, a container is needed for holding the contaminated water above the canister to permit gravity feeding.

Bags of the plastic film type such as common trash bags, plastic film sandwich and food bags, and the like, which are light weight, easy to pack, inexpensive, and disposable, are suitable for holding the contaminated water, but, such bags are not provided with a port for feeding the contaminated water to the water purification device.

SUMMARY OF THE INVENTION

A detachable connector apparatus is disclosed which is attached to the wall of a plastic film bag to provide an outlet from the bag so that fluid may flow through the connector for use as required.

A principal object of the invention is to provide a connector apparatus which may be quickly and easily attached and detached from plastic film bags to provide an outlet therefrom.

A further object of the invention is to provide apparatus of the character aforesaid which is usable with a wide variety of plastic film bags.

A further object of the invention is to provide apparatus of the character aforesaid which provides a leak proof connection.

A further object of the invention is to provide apparatus of the character aforesaid which is simple and inexpensive to construct but durable and long lasting in use.

A further object of the invention is to provide apparatus of the character aforesaid which requires a minimum of components.

A further object of the invention is to provide apparatus of the character aforesaid which may be used with a plastic film bag that is carried in a pouch.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is an exploded, elevational view illustrating the components of the connector apparatus of the invention;

FIG. 2 is a sectional view of the apparatus of FIG. 1 in assembled condition;

FIG. 4 is a fragmentary, sectional view, enlarged, of a portion of the apparatus illustrated in FIG. 3.

Figure 3:
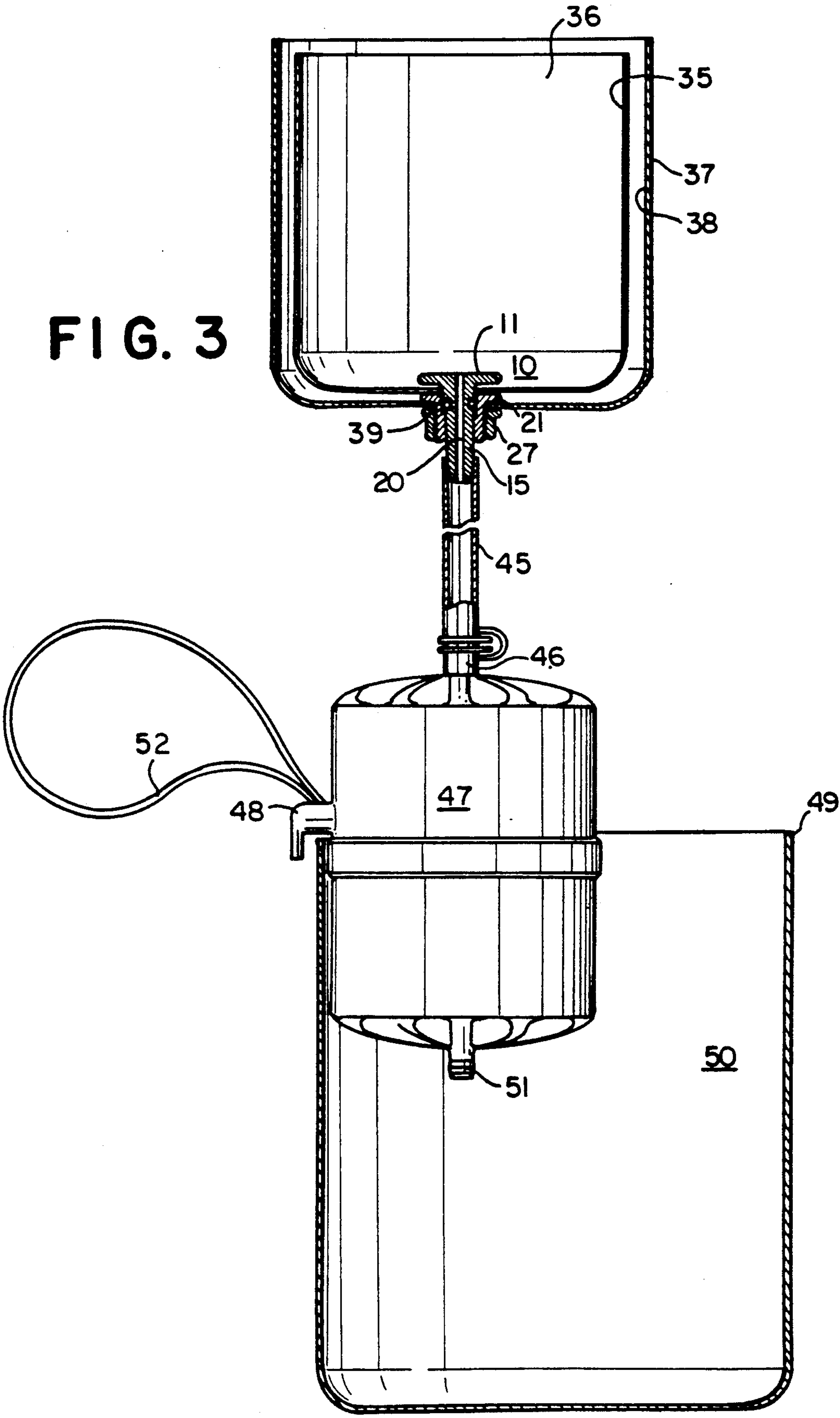
FIG. 3 is a view in front elevation, in partial section, illustrating the connector apparatus assembled to a bag, and to a water purification canister.

It should, of course, be understood that the description and drawings herein are merely illustrative and that various modifications and changes may be made in the structure disclosed without departing from the spirit of the invention.

Like numerals refer to like parts throughout the several views.

DETAILED DESCRIPTION OF THE DRAWINGS

Referring now more particularly to the drawings and FIGS. 1 and 2 thereof, the connector apparatus 10 as illustrated, includes a nipple 11 with a base 12, which has a rim or flange 14, with a tapered stem 15 extending perpendicularly from base 12. The stem 15 has a groove 16 with an O-ring 17 of well known, conventional type therein. The base 12 and stem 15 have a passageway 20 therethrough for fluid flow to be described.

A nipple clamp 21 is provided, of circular configuration, with a base 22, which has an outer rim or flange 23, and a cylindrical body portion 24 extending perpendicularly from base 22, with an outer tapered surface 25. The clamp 21 has a tapered passageway 26 which is intended to be engaged by the stem 15 in assembled condition. A locking ring 27 is provided of circular configuration, which has a tapered passageway 28 therein, which is intended to be engaged with the surface 25 of body portion 24, in assembled condition. The nipple 11, clamp 21 and locking ring 27 may be constructed of any suitable material, with delrin being preferred.

An end cap 30 is provided, which is of hat-like configuration, preferably constructed of flexible plastic and intended to fit over the tip 31 of stem 15 and seal off passageway 20.

Referring now additionally to FIGS. 3 and 4, a connector apparatus 10 as described above is shown in assembled condition and connected to the wall 35 of a bag 36, which as illustrated is of flexible plastic film supported in a pouch 37. The pouch 37 has a wall 38, and is preferably constructed of any suitable fabric such as canvas. The nipple 11 has been pushed through the wall 35 of bag 36 and a collar 39 of plastic film has been formed, which extends along and surrounds the stem 15, and covers the O-ring 17. The nipple clamp 21 has been pushed down over the stem 15 and the collar 39, wedging the collar 39 therebetween, compressing the O-ring 17 and providing a leakproof seal.

The pouch 37 has a hole 40 therethrough through which the stem 15 and body portion 24 of nipple clamp 21 extend, and over which the locking ring 27 has been pushed down until it compresses the wall 38 between locking ring 27 and nipple clamp 21.

A length of hollow plastic tubing 45 is engaged with the tip 31 of stem 15, and extends to the inlet 46 of a purification canister 47 such as the canister of the "first need" ® portable water purification device of General Ecology, Inc., Exton, Pa. The canister 47 has a bracket 48, which engages the rim 49 of a bucket 50 of well known type, and an outlet 51 for purified water to flow into bucket 50.

The canister 47 is also provided with a wrist strap 52 for additional canister 47 support.

Pouch 37 may be provided with a strap (not shown) to permit pouch 37 to be hung from a branch of a tree above canister 47 for gravity feeding of the water in bag 36 to canister 47.

It should be noted that while the bag 36 is shown supported in pouch 37, the bag 36, if constructed of suitably sturdy material and being of sufficient size, could be otherwise supported by hand, or by securing it to a tree limb or other support (not shown).

The mode of use and operation are apparent from the foregoing.

One particular application of the invention involves its use in gravity feeding water from a plastic bag to a water purification canister. Stem 15 of nipple 11 is pushed through wall 35 of plastic bag 36 creating an opening in the wall 35 and a collar 39 of plastic film surrounding the opening in the wall 35. Collar 39 extends along and surrounds the stem 15, and covers the O-ring 17. Nipple clamp 21 is pushed down over stem 15 and collar 39, wedging collar 39 and O-ring 17 tightly between nipple clamp 21 and stem 15 to provide a seal.

Cap 30 is placed on the end of stem 15 to close off passageway 20 to permit plastic bag 36 to be filled. Preferably, after being filled, plastic bag 36 is closed-off with a tie.

Optionally, water-filled bag 36 is placed in pouch 37, with nipple 15 extending out of hole 40 in pouch wall 38. Connector apparatus 10 is then secured to pouch 37 by mounting locking ring 27 onto the outer surface 25 of nipple clamp 21 to position the pouch wall 38 surrounding hole 40 between flange 23 of nipple clamp 21 and locking ring 27.

Cap 30 may now be removed, and tubing 45, which is connected to canister 47, may be inserted onto stem 15.

Pouch 37, with bag 36 being held therein, may be supported above canister 47, by hand or by hanging it from a tree, to permit gravity feeding of the water from bag 36 to canister 47.

I claim:

1. In combination, a pouch for surrounding and supporting a flexible plastic film bag, and a detachable connector apparatus for use with a flexible plastic film bag, said bag having a wall, to provide an outlet through the wall of the bag for fluid flow, said connector apparatus comprising nipple means for pushing through the wall of the plastic film bag for providing an outlet through the wall for fluid flow, said nipple means having a base and a tapered stem projecting from said base, said stem having an outer tapered surface, a passageway extending through said base and said stem, a groove formed on said stem, an O-ring positioned in said groove of said stem, and seal creating means for creating a seal between a portion of the wall of the plastic bag and the stem, said seal creating means including a nipple clamp having a tapered passageway removably engaging the outer tapered surface of said stem for compressing a portion of the wall of the plastic bag and said O-ring between said nipple clamp and said stem, said nipple clamp having a base and a frustoconical body extending from said base, and said frustoconical body having an outer tapered surface, said base of the nipple means including outwardly extending flange means positioned proximate the base of the nipple clamp for bracketing the flexible plastic film bag between said flange means and the base of the nipple clamp, and said pouch having a wall, and further including an opening in said wall of the pouch through which said nipple clamp extends, and a locking ring on said outer tapered surface of said nipple clamp body compressing said wall of the pouch between the locking ring and said nipple clamp.

2. A detachable connector apparatus for use with a flexible plastic film bag, said bag having a wall, to provide an outlet through the wall of the bag for fluid flow, comprising nipple means for pushing through the wall of the plastic film bag for providing an outlet through the wall for fluid flow, said nipple means having a base and a tapered stem projecting from said base, said stem having an outer tapered surface, a passageway extending through said base and said stem, a groove formed on said stem, an O-ring positioned in said groove of said stem, and seal creating means for creating a seal between a portion of the wall of the plastic bag and the stem, said seal creating means including a nipple clamp having a tapered passageway removably engaging the outer tapered surface of said stem for compressing a portion of the wall of the plastic bag and said O-ring between said nipple clamp and said stem, the flange means of the base of the nipple means being an outwardly extending annular flange, the nipple clamp having a base having an outwardly extending annular flange, said base of the nipple means including outwardly extending flange means positioned proximate the base of the nipple clamp for bracketing the flexible plastic film bag between the flange of the nipple means and the flange of the nipple clamp, said stem having an outer tapered surface, and the annular flange of the base of the nipple means and the annular flange of the base of the nipple clamp forming opposed walls for positioning a portion of the wall of the plastic bag between.

3. Connector apparatus of claim 2, in which an end cap is provided on said stem to seal off said passageway.

4. In combination, a flexible plastic film bag and the connector apparatus of claim 2, the plastic bag having a bag wall, the bag wall having an opening and a collar surrounding the opening, said nipple stem extending through said opening and engaging said collar, said nipple clamp being mounted on said collar and over said stem to compress said collar and said O-ring between said nipple clamp and said stem to form a seal therewith.

5. In combination, a water purification device, a length of tubing, and the connector apparatus of claim 2, in which one end of the length of tubing is connected to said stem, and the other end of said tubing is connected to the water purification device.

6. In combination, a flexible plastic film bag, said bag having a bag wall, a pouch for surrounding and supporting the bag, and a detachable connector apparatus for use with the flexible plastic film bag to provide an outlet through the wall of the bag for fluid flow, the connector apparatus comprising nipple means for pushing through the wall of the plastic film bag for providing an outlet through the wall for fluid flow, said nipple means having a base and a tapered stem projecting from said base, said stem having an outer tapered surface, a passageway extending through said base and said stem, a groove formed on said stem, an O-ring positioned in said groove of said stem, and seal creating means for creating a seal between a portion of the wall of the plastic bag and the stem, said seal creating means including a nipple clamp having a tapered passageway removably engaging the outer tapered surface of said stem for compressing a portion of the wall of the plastic bag and said O-ring between said nipple clamp and said stem, said nipple clamp having a base and a frustoconical body extending from said base, and said frustoconical body having an outer tapered surface, said base of the nipple means including outwardly extending flange means positioned proximate the base of the nipple clamp for bracketing the flexible plastic film bag between said flange means and the base of the nipple clamp, and said pouch having a wall, and further including an opening in said wall of the pouch through which said nipple clamp extends, and a locking ring on said outer tapered surface of said nipple clamp body compressing said wall of the pouch between the locking ring and said nipple clamp, the plastic bag having a bag wall, the bag wall having an opening and a collar surrounding the opening, said nipple stem extending through said opening and engaging said collar, said nipple clamp being mounted on said collar and over said stem to compress said collar and said O-ring between said nipple clamp and said stem to form a seal therewith, and an end cap provided on the stem of the nipple means for sealing of the passageway extending through the base and the stem of the nipple means.

* * * * *